Patented July 15, 1924.

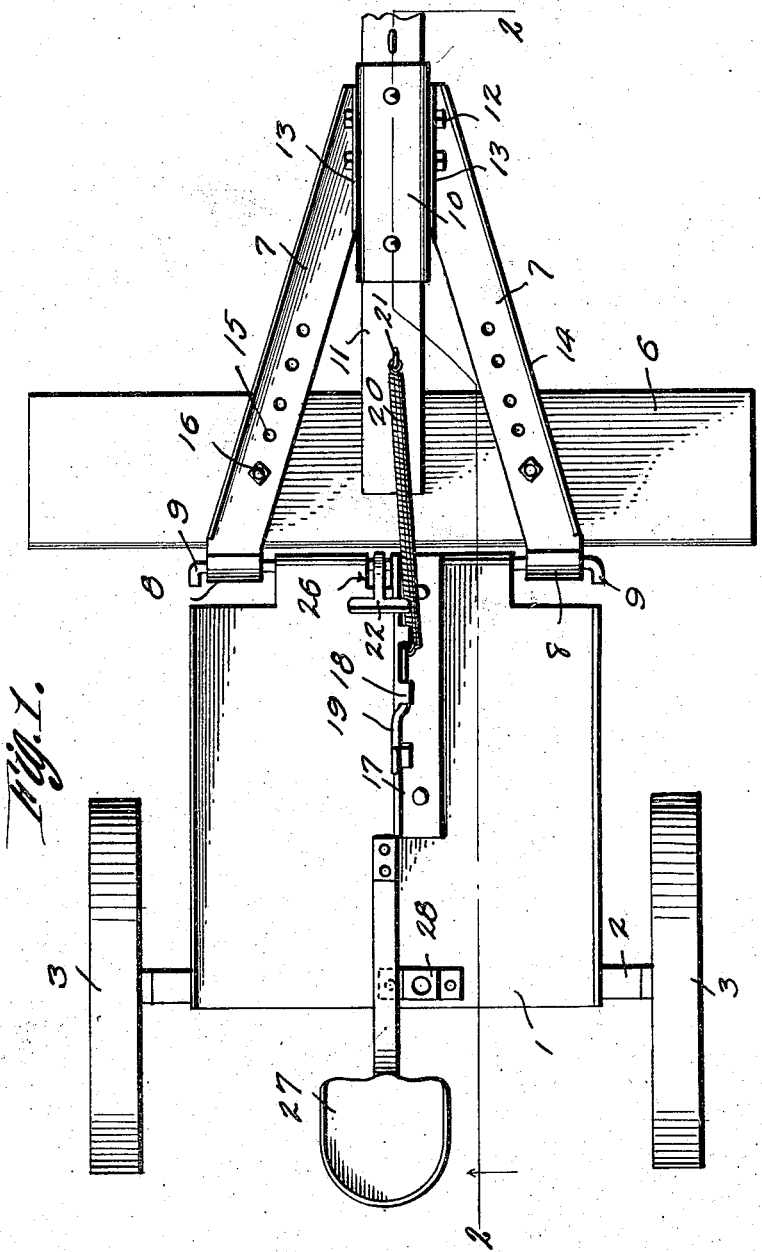

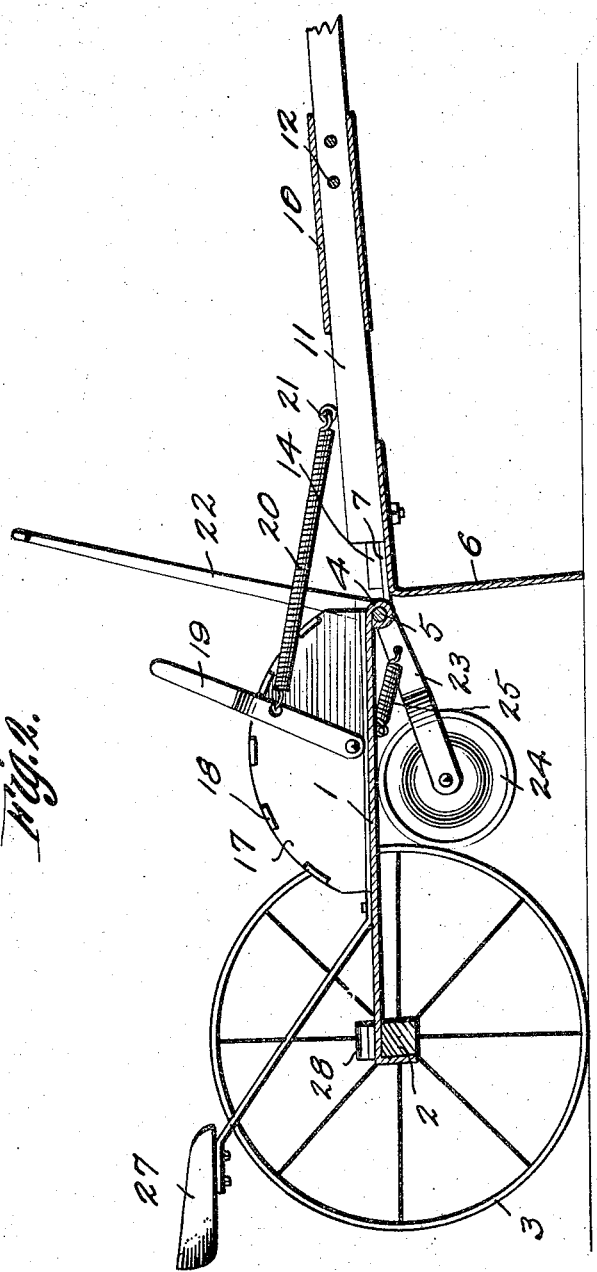

1,501,892

UNITED STATES PATENT OFFICE.

ISAAC W. DUNNING AND HENRY CLAY SHIPLEY, OF WAPANUCKA, OKLAHOMA; SAID SHIPLEY ASSIGNOR OF HIS INTEREST TO LEE McBEE.

COMBINATION ROAD AND FARM DRAG.

Application filed March 1, 1922. Serial No. 540,206.

*To all whom it may concern:*

Be it known that ISAAC W. DUNNING, and HENRY CLAY SHIPLEY, citizens of the United States, residing at Wapanucka, in the county of Johnston and State of Oklahoma, have invented certain new and useful Improvements in Combination Road and Farm Drags, of which the following is a specification.

This invention relates to a combination road and farm drag, and has for its object the production of a simple and efficient drag, which may be conveniently used for leveling down rows of last year's cultivation, and filling up depressions, in the surface of the ground over which the machine is traveling.

Another object of this invention, is the production of a simple means for adjusting the scraping means of the drag, to cause the scraper means to cut deep or shallow.

With these and other objects in view, this invention consists of certain novel constructions, combinations, and arrangements of parts, as will be hereinafter fully described and claimed.

Reference to be had to the accompanying drawings forming a part of this specification, it being understood that the drawings are merely illustrative of one example of the invention.

Figure 1 is a top plan view of the combination road and farm drag.

Figure 2 is a section taken on line 2—2 of Figure 1.

By referring to the drawings, it will be seen that 1 designates the platform of the drag, which is supported upon an axle 2, this axle 2 being in turn supported upon the wheels 3. The forward edge of the platform 1 is rolled, as indicated at 4 for the purpose of constituting a support for the drag supporting rod 5, the rod 5 extending through the rolled portions 4 as shown in Figure 2. A scraper or drag blade 6 is carried in front of the platform 1, and is preferably formed of angle iron, as shown in Figure 2. A pair of converging tongue supporting braces 7 are adjustably secured to the upper face of the blade 6 and have their rear ends rolled as indicated at 8, through which rolled ends extend the respective ends 9 of the rod 5. The ends 9 of the rod 5 are bent rearwardly for the purpose of preventing the rod 5 from being accidentally disengaged from the braces 7. A tongue receiving socket 10, is interposed between the forward ends of the braces 7, and the tongue 11 extends therethrough and has its rear end resting upon the upper face of the blade 6. The tongue 11 is secured in the socket 10 by means of suitable bolts 12. The bolts 12 also extend through the flanges 13 carried by the forward ends of the braces 7, in this way efficiently connecting the braces 7 with the tongue 11 and the socket 10. The braces 7 are preferably formed of angle iron and are provided with upstanding side flanges 14 upon their outer side edges. A plurality of adjusting apertures 15 are formed in the braces 7, and bolts 16, which are carried by the blade 6, pass through the selected apertures, and hold the blade 6 in an adjusted position, to suit the desire of the operator.

From the foregoing description, it will be seen that the blade 6 may be easily adjusted to set at any desired angle to the longitudinal axis of the drag, in order that the scrapings from the road may be thrown either to the side or the center of a road, upon which the device may be working. It should be further understood that any desired tongue may be used with the present device, to suit the character of the work which is being done.

A quadrant plate 17 is carried by the platform 1, and extends vertically thereof. A plurality of teeth 18 are formed upon the upper edge of the plate 17, for receiving the operating lever 19, which lever 19 is pivotally mounted upon the plate 17. A coil spring 20 is carried by the lever 19 and has its forward end connected to the tongue 11, as indicated at 21. The blade 6 may be adjusted by means of this lever 19, to cut either deep or shallow, or may be adjusted to cut into the surface of the ground over which the machine is passing, to suit the desire of the operator. The lever 19 may be held in an adjusted position by engaging the teeth 18 of the quadrant plate 17.

A dumping lever 22 is journaled upon the rod 5 and is provided with an angularly extending end 23, projecting under the platform 1. A wheel 24 is carried by the lower end of the end 23, and is adapted to be thrown in engagement with the ground, by means of the lever 22, for raising the forward end of the platform 1 and dumping the load, which may be carried by the platform, therefrom. As is the usual custom with drags of the character described, a load of rock or stone, is placed upon the platform 1, for the purpose of adding weight thereto. Consequently, in order to facilitate the dumping of a load from the platform 1, the lever 22 is provided. A coil spring 25 is connected to the under face of the platform 1, and to the end 23 of the lever 22 for normally holding the wheel 24 out of engagement with the ground, over which the machine may be passing. As shown in Figure 2, the lever 22 passes through a notch 26 formed in the forward edge of the platform 1.

A seat 27, is carried by the rear end of the platform 1, and a coupling bracket 28 is carried by the platform 1 upon the upper face thereof, near the rear end, and below the seat 27, for permitting a grain drill to be attached thereto. In this way, it will be possible to level and smooth the land and sow the grain at the same time.

It should be understood that any form of draft means may be used in connection with the present device, and that the drag may be used equally well for road building, as would be the case if the same were used for leveling a field for the purpose of sowing grain. It should be further understood that certain detail changes may be made in the detail construction of the device, without departing from the spirit of the invention, so long as the changes fall within the scope of the appended claims.

Having fully described the invention, what is claimed as new, is:

1. A combined road and farm drag comprising a flat plate forming a platform, a depending flange formed on the rear end of the platform, a supporting axle secured to the lower surface of the platform in engagement with the flange, supporting wheels mounted upon said axle, a hinge barrel formed on the forward end of the plate, a hinge pin mounted in said barrel, a pair of converging braces having their rear ends mounted upon said pivot pin, a draft appliance connected to the forward converged ends of the brace bars, the brace bars having openings formed therein, a transversely extending adjustable scraper blade, and bolts carried by the scraper blade adapted to be placed in any one of the openings in the brace bars.

2. A combined farm and road drag comprising a platform plate, a supporting axle and wheels carried by the rear end of the supporting plate, a hinge pin carried by the forward end of the platform plate, converging brace rods mounted upon said hinge pin, a scraper blade connected to said brace rods, an angle lever mounted at its angle upon said hinge pin, an operating handle formed upon the upper end of the angle lever, and a wheel carried by the lower end of said angle lever.

In testimony whereof we affix our signatures in presence of two witnesses.

ISAAC W. DUNNING.
H. CLAY SHIPLEY.

Witnesses:
M HANCOCK,
J. G. RAMSEY.